No. 747,301.  Patented December 15, 1903.

UNITED STATES PATENT OFFICE.

NEANDER N. CRONHOLM, OF CHICAGO, ILLINOIS.

EDIBLE FAT AND PROCESS OF MAKING SAME.

SPECIFICATION forming part of Letters Patent No. 747,301, dated December 15, 1903.

Application filed January 14, 1903. Serial No. 139,066. (No specimens.)

*To all whom it may concern:*

Be it known that I, NEANDER N. CRONHOLM, a citizen of the United States of America, and a resident of Chicago, in the county of Cook and State of Illinois, have invented certain new and useful Improvements in Edible Fats and Processes of Making the Same, of which the following is a specification.

The present invention relates to a food product and process of preparing the same, and has for its object to produce in an efficient and economical manner an edible fat of an oleaginous nature closely resembling ordinary butter, which in addition to being free from any injurious or deleterious coloring materials heretofore commonly employed in the present class of edible fats is adapted to withstand ordinary changes of temperature and climate and preserve its original nature and properties during shipment and storage previous to use.

The present invention involves the treatment of ordinary butter, butterin, oleomargarin, oleo-oil, neutral lard, and other like fats or oils used as food products whereby a solidified nature closely approximating that of ordinary butter is imparted to the resultant product of the present process and which solidified nature will prevail during storage, changes of temperature, and other like ordinary influences to which the present class of food products are exposed.

To such end a material and novel part of the present invention consists in the use of albumen, preferably in the form of ordinary egg-batter, as an admixture with one or more of the above-mentioned oleaginous substances to impart the desired solidified or butter-like nature to the same and with or without the presence of a preservative, such as common salt.

The relative proportions of the different substances comprising the present food product will vary to suit the season of the year in which the product is made, the climate to which it is to be shipped, and such other ordinary conditions, all of which are to be taken into consideration to aid the judgment of the manufacturer in selecting the proper proportions to produce an article best suited to any special condition. The following formula is given in this connection as affording a product of very superior quality and appearance and which is specially adapted for the ordinary summer season of temperate climes: albuminous egg-batter, four parts; oleo-oil, five parts; neutral lard, seven parts; butter, one part; salt, one part.

In the process part of the present invention the yolks and whites of hen or other like eggs are placed in an ordinary mixing or beating machine, such as generally employed in the confectionery art, and converted into a foam-like mass. To such foam-like mass the required quantity of butter, oleo-oil, and neutral lard are added in a heated condition and the mixing or beating operation continued for a period of time to effect a thorough and intimate mixture of the substances. When such intimate mixture has been effected, a gradual cooling of the mixed mass is effected in any usual and well-known manner until the mass has thickened or solidified, after which the mass is removed from the mixing or beating machine and the salt added and worked in, preferably on an ordinary butter-table.

A material part of the present invention consists in effecting the above-described mixture of the materials at a temperature which will cause a rapid coagulation of the egg-foam, as it has been found from continued practical experiment that with such rapid coagulation during the mixing or beating operation of the mixed materials a very perfect combination of the different materials is effected and a very superior and natural butter-like product produced with a color closely resembling that of butter. With a reduced temperature, such as will not effect a rapid coagulation of the egg-foam, it has been found that an intimate mixture of the materials is difficult, while the product has a very curdy nature and is liable to subsequent separation of the materials under ordinary conditions of storage and shipment.

From practical experiment I find that a temperature less than 120° Fahrenheit will not produce a good commercial and keeping product and that with a temperature of from 150° to 200° Fahrenheit a very superior commercial product is produced having very superior keeping qualities.

It is within the province of the present invention to employ ordinary albumen instead of the whites and yolks of hen or other like eggs. Such latter is, however, preferred, owing to the freshness at which the same can be readily obtained, as well as the fact that the yolks afford a means for imparting an agreeable yellow color to the product.

Having thus fully described my said invention, what I claim as new, and desire to secure by Letters Patent, is—

1. The herein-described process of preparing edible fats, the same consisting in converting albumen into a foam-like mass, melting an oleaginous body, mixing therewith the foam-like albumen, stirring the mass during the mixing operation, cooling the mass in a gradual manner, and continuing the stirring operation during such cooling of the mass.

2. The herein-described edible fat, the same consisting of a mixture of a foam-like mass of albumen, and an oleaginous body, the oleaginous body predominating, intimately commingled while the oleaginous body is in a melted condition.

3. The herein-described edible fat, the same consisting of a mixture of a foam-like mass of albumen formed from the whites and yolks of eggs, and an oleaginous body, the oleaginous body predominating, intimately commingled while the oleaginous body is in a melted condition.

4. The herein-described edible fat, the same consisting of a mixture of a foam-like mass of albumen, and an oleaginous body, the oleaginous body predominating, intimately commingled while the oleaginous body is in a melted condition, and a preservative quantity of common salt added to the mixture when cooled.

5. The herein-described edible fat, the same consisting of a mixture of a foam-like mass of albumen formed from the whites and yolks of eggs, and an oleaginous body, the oleaginous body predominating, intimately commingled while the oleaginous body is in a melted condition, and a preservative quantity of common salt added to the mixture when cooled.

Signed at Chicago, Illinois, this 12th day of January, 1903.

NEANDER N. CRONHOLM.

Witnesses:
ROBERT BURNS,
HENRY A. NOTT.